No. 662,618. Patented Nov. 27, 1900.
H. B. CAMP.
COUPLING FOR STONEWARE PIPES.
(Application filed Sept. 6, 1900.)

(No Model.)

Witnesses:
Orna S Lee
Bessie Crook

Inventor:
Horace B. Camp,
By Humphrey & Humphrey,
Attorneys.

UNITED STATES PATENT OFFICE.

HORACE B. CAMP, OF AKRON, OHIO.

COUPLING FOR STONEWARE PIPES.

SPECIFICATION forming part of Letters Patent No. 662,618, dated November 27, 1900.

Application filed September 6, 1900. Serial No. 29,131. (No model.)

*To all whom it may concern:*

Be it known that I, HORACE B. CAMP, a citizen of the United States, residing at Akron, in the county of Summit and State of Ohio, have invented a certain new and useful Improvement in Couplings for Stoneware Pipes, of which the following is a specification.

My invention has relation to improvements in couplings for underground pipes for conducting fluids or gases or to constitute cases for electrical wires and cables, and has especial relation to connecting sections of stoneware pipes, and is an improvement on Patent No. 110,028, granted to George C. Germain December 18, 1870, and Patent No. 413,170, granted to me October 22, 1889. In the use of these couplings it is found that with the greatest care they are not always sufficiently strong to resist the tendency of the pipe ends to draw slightly apart when the joint settles, thus permitting the fluid in the pipes to encounter the fabric and gradually creep through the coupling, thus destroying its efficiency.

The object of my invention is to overcome this objection; and it consists in strengthening the coupling with reinforcing layers or plies of metal having sufficient interstices to permit of the adhesion of the layers of asphaltum-saturated fabric.

In applying my invention the metal plies may be of strap or band iron wound spirally or by closely-perforated sheet metal; but a preferred form is to interpose alternately with the woven fabric a wire-netting, the strength of which will be regulated by the degree of strain the joint will probably be subjected to.

My invention is illustrated in the accompanying drawings, in which similar reference-numerals indicate like parts, and of which—

Figure 1:
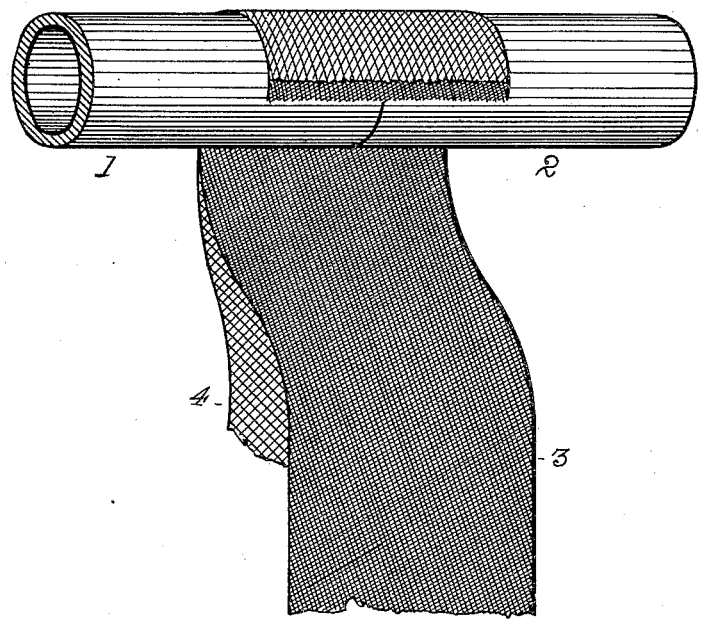
Figure 2:
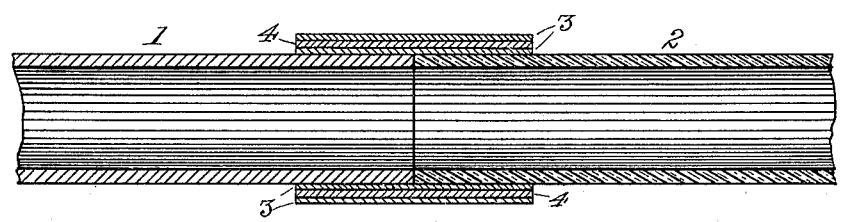

Figure 1 is a perspective of the adjacent ends of two sections of stoneware pipe with the layers of woven asphaltum-saturated fabric and wire-netting partially wound thereon to illustrate the manner of applying my improved coupling, and Fig. 2 a central longitudinal section of the same with the completed coupling thereon.

Referring to the drawings, 1 2 are the ends of the two sections of pipe to be united. These ends 1 2 are brought together to register accurately, and while in that position a strip of fabric 3 of any approved kind, but burlaps will be found well adapted to the purpose, saturated in melted asphaltum is placed on these ends to cover the joint and at the commencement of forming the coupling partially wound thereon. The metallic portion, which for the purpose of this specification is wire-netting 4, is then laid on the fabric a short distance back from the end, and the two are then wound together around the joint until both are completely wound thereon. In doing this the netting is shorter than the fabric, so that when it is all used there will remain enough of the fabric to cover it, and thus protect it from moisture and any destructive element in the soil. By this construction I secure great strength in the joint to resist longitudinal or lateral strain, while maintaining enough flexibility in the joint to prevent its breaking from any slight unevenness in the bottom of the trench.

Having thus described my invention, what I claim, and desire to secure by Letters Patent, is—

1. An improved pipe-coupling consisting of a strip of fabric saturated with asphaltum wrapped about the adjacent ends of the pipe-sections in combination with a metallic band having interstices to permit the asphaltum to unite the layers of fabric and wrapped in alternate layers with the fabric about the pipe ends substantially as shown and described.

2. An improved pipe-coupling consisting of a strip of fabric saturated with asphaltum wrapped about the adjacent ends of the pipe-sections in combination with a metallic band having interstices to permit the asphaltum to unite the layers of fabric, and wrapped in alternate layers with the fabric about the pipe ends, the strip of fabric extending beyond the metallic band at the inner ply, and at the outer ply sufficiently to cover the metallic band, substantially as described.

In testimony that I claim the above I hereunto set my hand in the presence of two subscribing witnesses.

HORACE B. CAMP.

Witnesses:
C. P. HUMPHREY,
C. E. HUMPHREY.